(12) United States Patent
Lair

(10) Patent No.: US 6,845,946 B2
(45) Date of Patent: Jan. 25, 2005

(54) SELF STOWING THRUST REVERSER

(75) Inventor: Jean-Pierre Lair, San Antonio, TX (US)

(73) Assignee: The Nordam Group, Inc., Tulsa, OK (US)

( * ) Notice: Subject to any disclaimer, the term of this patent is extended or adjusted under 35 U.S.C. 154(b) by 0 days.

(21) Appl. No.: 10/781,410

(22) Filed: Feb. 18, 2004

(65) Prior Publication Data

US 2004/0195443 A1 Oct. 7, 2004

Related U.S. Application Data

(60) Provisional application No. 60/449,083, filed on Feb. 21, 2003.

(51) Int. Cl.[7] .............................. B64C 1/00; F02K 1/70
(52) U.S. Cl. .................................. 244/110 B; 60/226.2
(58) Field of Search .......................... 244/110 B, 110 A, 244/110 R, 113; 60/226.2, 226.3

(56) References Cited

U.S. PATENT DOCUMENTS

| | | | |
|---|---|---|---|
| 3,503,211 A | | 3/1970 | Medawar et al. |
| 3,614,037 A | | 10/1971 | Vdolek |
| 3,764,096 A | * | 10/1973 | Wright .................... 244/110 B |
| 3,779,010 A | | 12/1973 | Chamay et al. |
| 3,829,020 A | | 8/1974 | Stearns |
| 4,922,712 A | | 5/1990 | Matta et al. |
| 4,960,243 A | * | 10/1990 | Dubois et al. ......... 239/265.29 |
| 5,039,171 A | * | 8/1991 | Lore ...................... 239/265.29 |
| 5,090,197 A | * | 2/1992 | Dubois ....................... 60/226.2 |
| 5,655,360 A | | 8/1997 | Butler |
| 5,779,192 A | | 7/1998 | Metezeau et al. |
| 5,782,434 A | * | 7/1998 | Jean ........................ 244/110 B |
| 5,819,528 A | * | 10/1998 | Masson ...................... 60/226.2 |
| 5,826,823 A | | 10/1998 | Lymons et al. |
| 5,893,265 A | * | 4/1999 | Gonidec et al. ........... 60/226.2 |
| 5,913,476 A | * | 6/1999 | Gonidec et al. ....... 239/265.31 |
| 6,065,285 A | * | 5/2000 | Gonidec et al. ........... 60/226.2 |
| 6,079,201 A | * | 6/2000 | Jean .......................... 60/226.2 |
| 6,082,096 A | * | 7/2000 | Vauchel ..................... 60/226.2 |
| 6,151,884 A | * | 11/2000 | Gonidec et al. ........... 60/226.2 |
| 6,293,495 B1 | * | 9/2001 | Aten et al. .............. 244/110 B |
| 6,311,928 B1 | * | 11/2001 | Presz et al. ............. 244/110 B |
| 6,568,172 B2 | * | 5/2003 | Jannetta et al. ............ 60/226.2 |
| 6,622,964 B2 | * | 9/2003 | Rouyer et al. .......... 244/110 B |
| 6,625,972 B1 | * | 9/2003 | Sternberger ................ 60/226.2 |
| 2004/0068978 A1 | * | 4/2004 | Lair et al. .................. 60/226.2 |

OTHER PUBLICATIONS

U.S. Appl. No. 10/679,882; filed Oct. 06, 2003, entitled "Bifold Door Thrust Reverser".

* cited by examiner

*Primary Examiner*—Teri P. Luu
*Assistant Examiner*—Stephen A. Holzen
(74) *Attorney, Agent, or Firm*—Francis L. Conte

(57) ABSTRACT

A thrust reverser includes forward and aft louvers pivotally mounted in a compartment defining a flow tunnel through the outer and inner skins of a fan nacelle. An aft flap is integrally joined to the aft louver for rotation therewith. A unison link joins together the forward and aft louvers. And, an actuator is joined to the louvers for rotation thereof between a stowed position in which the louvers and flap are closed in the nacelle skins and a deployed position in which the louvers and flap are pivoted open from the skins.

25 Claims, 4 Drawing Sheets

SELF STOWING THRUST REVERSER

This application claims the benefit of U.S. Provisional Applications 60/449,083; filed Feb. 21, 2003.

BACKGROUND OF THE INVENTION

The present invention relates generally to aircraft engines, and, more specifically, to thrust reversers therein.

Turbofan engines are typically composed of a fan driven at the front of the engine that draws air through a bypass duct that is bounded by the engine cowling on the inner surface and by the fan cowling on the outer surface. In the case of a short nacelle, the generally annular duct that is bounded by the inner cowling and the outer cowling channels the bypass flow only, while in the case of a long nacelle, the upstream portion of the annular duct channels the bypass flow only, and its downstream portion channels both the bypass flow and the engine core flow.

Thrust reversers for turbofan type engines are well known in the art. The nacelle of the turbofan engine on which the thrust reverser can be installed can be long or short. The engine of the aircraft can be installed under the wing or on the fuselage. The thrust reverser can be installed on commercial or business aircraft.

The known prior art fan thrust reversers can be, generally speaking, categorized in three distinct types. The first type effects aft axial translation of the bypass structure for deployment of a series of blocker doors inside the bypass duct structure and the opening of an aperture in conjunction with exposing of radial cascade vanes for redirecting the bypass flow in the forward direction.

The second type also effects aft axial translation of the bypass structure for closing the bypass flow duct and opening an aperture for redirecting the bypass flow in the forward direction. The aperture of the prior art may or may not be equipped with cascades vanes. The second type differs from the first type as the series of blocker doors is no longer present.

The third type includes doors that rotate inside the bypass flow and outside in the ambient air for redirecting the bypass flow in the forward direction. This fan reverser type is generally called petal or pivoting door reverser.

The drawbacks of the first type prior art fan reversers are the necessity to provide aft translation capability to the rear portion of the bypass duct for reversing the fan flow, and the presence in the bypass duct of links, known as drag links, for the deployment of the series of blocker doors. The drag links degrade engine performance in forward thrust, while the required guiding and sliding tracks of the translating cowls increase weight of the nacelle.

While the second type of fan reverser appears to be an improvement, since the drag links and the associated series of blocker doors have been eliminated, its drawback is that it necessitates the provision of a large bulge on the cowling of the engine so that the structure of the bypass duct that translates rearward can block the bypass flow for reverse flow purposes.

Although the third type appears to be an improvement over the first and second types, its main drawback is the presence of wells in the bypass duct for housing the actuators that control pivoting of the doors. The forward engine performance degradation that is associated with these wells usually requires an additional flap mechanism for fairing them. Other drawbacks of this type of fan reverser are the required large actuator stroke and the extensive protrusion of the pivoting doors in the ambient air when they are pivoted to their deployed position.

During thrust reverse operation, the doors are driven from their flush and stowed position to their deployed and rotated position. The deployed doors may thusly engage the aft-flowing ambient freestream air, and the aft-flowing engine exhaust flow for redirecting it forward to provide aircraft braking thrust.

Since the freestream air and exhaust flow exert aerodynamic pressure loads on the deployed doors which act in the direction of deployment, redundant latching systems are typically used to prevent inadvertent deployment of the doors. Such latching systems add complexity, weight, and expense to the thrust reverser system.

Accordingly, it is desired to provide an improved fan thrust reverser which is self contained in the fan nacelle for reducing size, complexity, weight, and drag.

More specifically, a first object of the thrust reverser is to provide a self-stowing feature.

A second object of the thrust reverser is to provide thrust reverse in a turbofan engine that does not require aft translation of any portion of the bypass duct.

A third object of the reverser is to eliminate drag links in the bypass duct when the reverser is in its forward thrust position.

A fourth object of the reverser is to provide for optimum direct thrust performance of the engine, and a clean aerodynamic boundary flow surface for the outer cowling of the bypass duct.

A fifth object of the reverser is to eliminate the series of cascades.

A sixth object of the reverser is to limit the amount of external protrusion in the ambient air of the thrust reverser structure when in the deployed position.

A seventh object of the reverser is to reduce the stroke of the deployment actuators for further weight reduction.

BRIEF SUMMARY OF THE INVENTION

A thrust reverser includes forward and aft louvers pivotally mounted in a compartment defining a flow tunnel through the outer and inner skins of a fan nacelle. An aft flap is integrally joined to the aft louver for rotation therewith. A unison link joins together the forward and aft louvers. And, an actuator is joined to the louvers for rotation thereof between a stowed position in which the louvers and flap are closed in the nacelle skins and a deployed position in which the louvers and flap are pivoted open from the skins.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
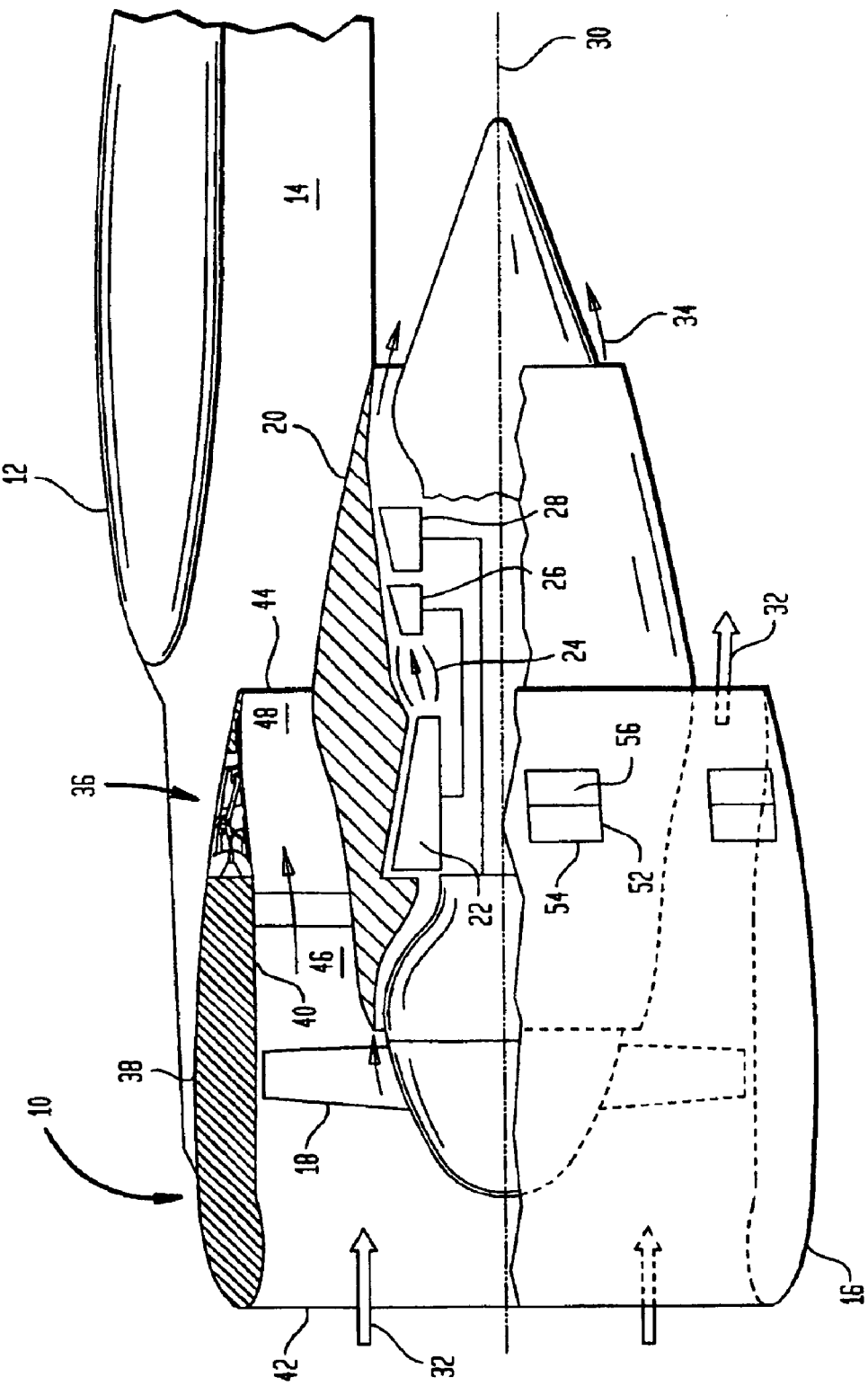
FIG. 1 is a partly sectional axial view of an exemplary turbofan aircraft gas turbine engine mounted to an aircraft wing, and including a fan thrust reverser integrated in the fan nacelle thereof.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of the air is pressurized by the driven fan 18 for producing a substantial portion of the propulsion thrust powering the aircraft in flight. The combustion gases 34 are exhausted from the aft outlet of the core engine for providing additional thrust.

However, during landing operation of the aircraft, thrust reversal is desired for aerodynamically slowing or braking the speed of the aircraft as it decelerates along a runway. Accordingly, the turbofan engine 10 includes a fan thrust reverser 36 wholly contained in or integrated into the fan nacelle 16 for selectively reversing fan thrust during aircraft landing.

The fan thrust reverser, or simply fan reverser 36 is integrated directly into the fan nacelle 16. The fan nacelle includes radially outer and inner cowlings or skins 38,40 which extend axially from a leading edge of the nacelle defining an annular inlet 42 to an opposite trailing edge defining an annular outlet 44. The fan nacelle 16 may have any conventional configuration, and is typically formed in two generally C-shaped halves which are pivotally joined to the supporting pylon 14 for being opened during maintenance operations.

The exemplary fan nacelle illustrated in FIG. 1 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle 16 by a row of supporting struts in a conventional manner. The core cowl 20 is spaced radially inwardly from the inner skin 40 of the fan nacelle to define an annular bypass duct 46 therebetween which bypasses a major portion of the fan air around the core engine during operation. The fan bypass duct terminates in an annular fan nozzle 48 at the nacelle trailing edge or outlet 44.

A particular advantage of the fan reverser 36 is that the fan nozzle 48 itself may remain fixed at the aft end of the fan nacelle surrounding the core engine. And, the fan reverser 36 may be fully integrated in the fan nacelle immediately forward or upstream from the fixed fan nozzle.

Figure 2:
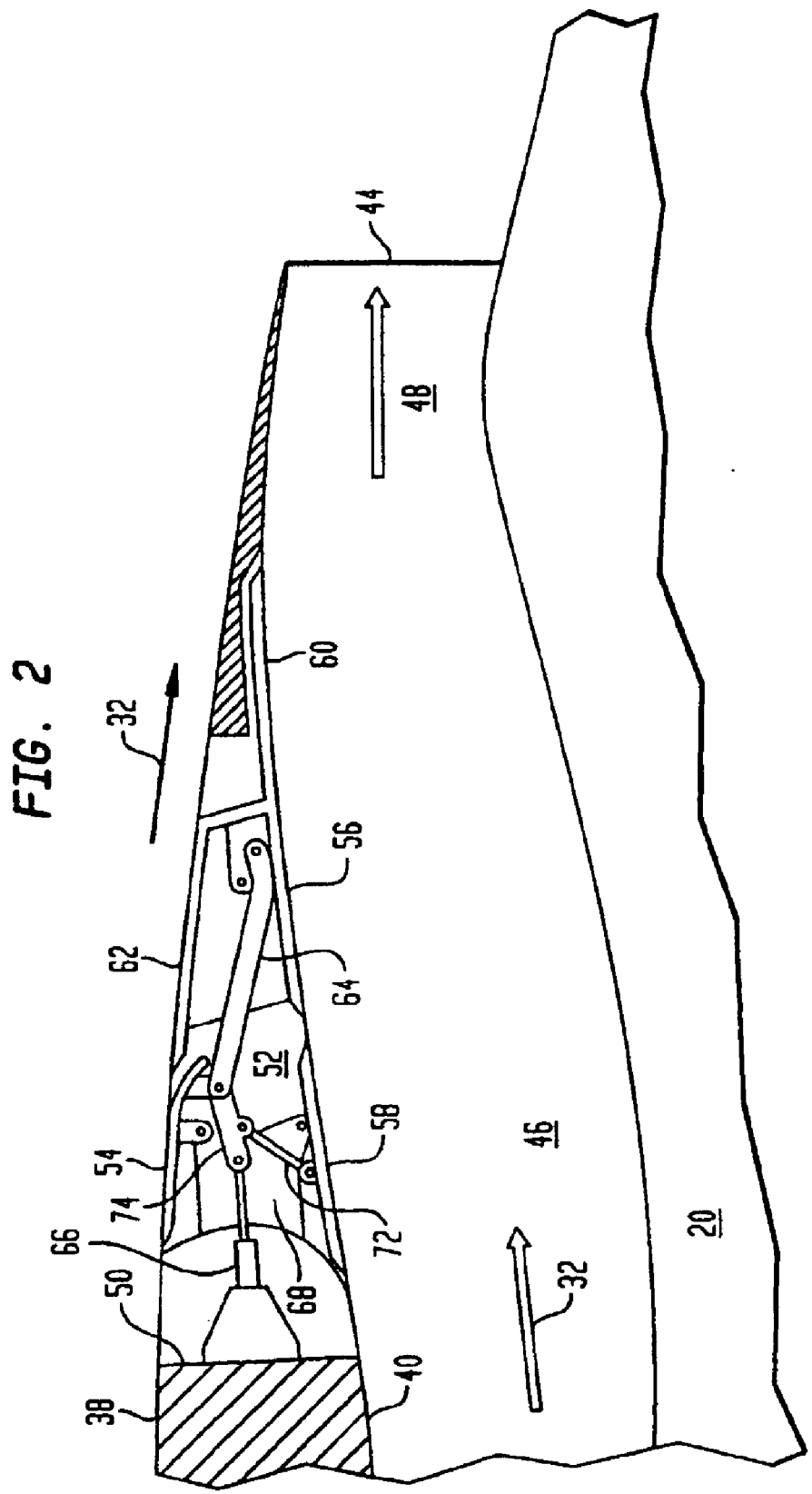
FIG. 2 is an axial sectional view of the fan reverser illustrated in FIG. 1 in a stowed position.
Figure 3:
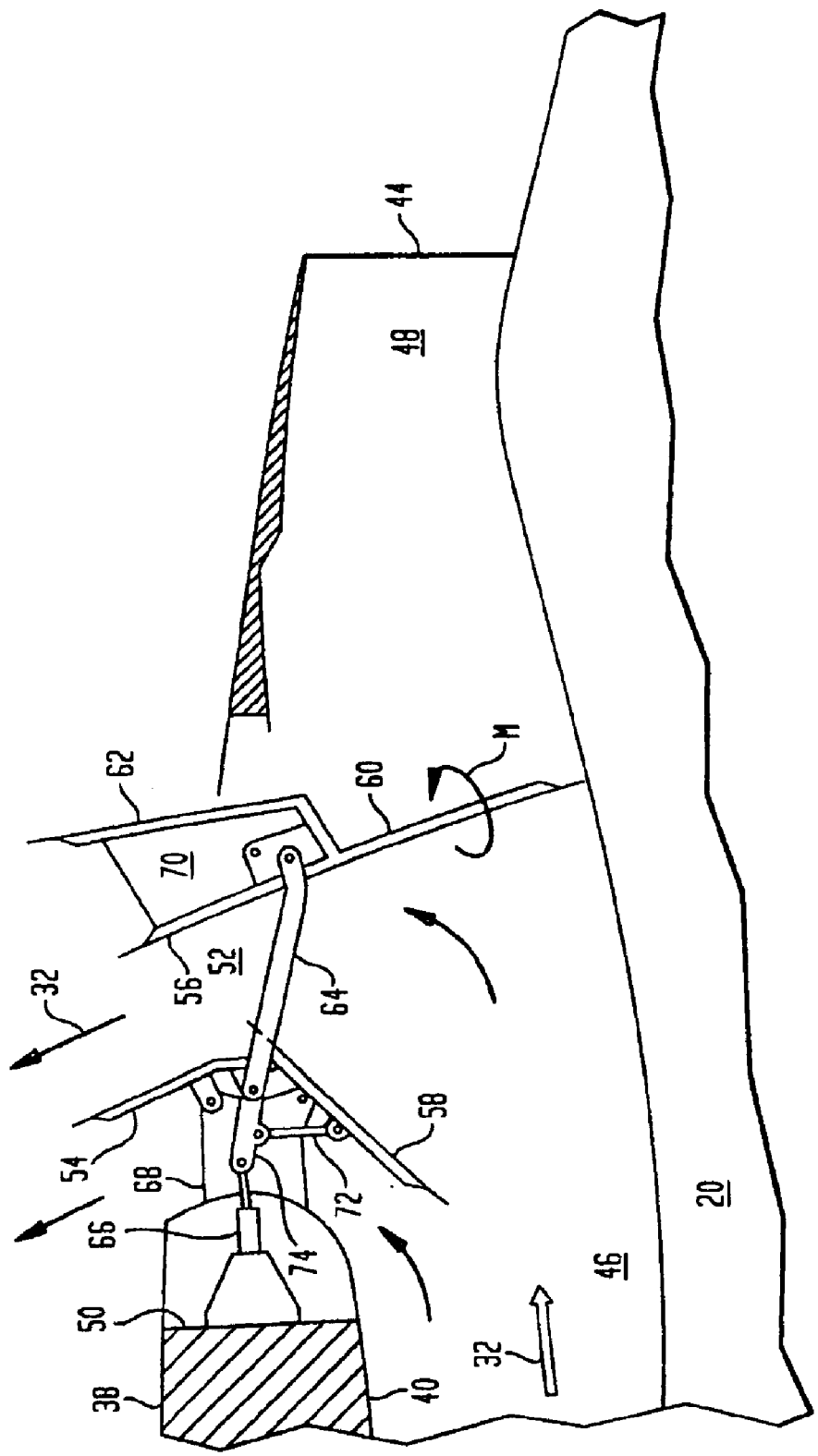
FIG. 3 is an axial sectional view of the fan reverser illustrated in FIG. 2 in a deployed position.

More specifically, the fan reverser is illustrated in more detail in FIGS. 2 and 3 wherein the outer and inner skins 38,40 are spaced radially apart to define an arcuate compartment or annulus 50 spaced axially forwardly from the nacelle trailing edge 44. The nacelle compartment 50 includes a flow tunnel or channel 52 extending radially between the inner and outer skins through which the pressurized fan bypass air 32 may be discharged during thrust reverse operation.

All components of the fan reverser 36 may be fully contained within the corresponding compartment 50 therefor. In particular, the fan reverser includes a forward louver or door 54 suitably pivotally mounted in the compartment near the outer skin. Correspondingly, an aft louver or door 56 is suitably pivotally mounted in the compartment aft or behind the forward louver 54 near the inner skin.

Cooperating forward and aft flaps 58,60 are suitably pivotally mounted in the compartment along the inner skin 40. And, an aft fairing 62 is suitably pivotally mounted in the compartment behind the forward louver along the outer skin.

The forward louver 54 and aft fairing 62 conform with the contour of the outer skin 38 and are flush therewith to close the outlet end of the tunnel along the outer skin in the stowed position. The forward louver 54 and aft fairing 62 have generally convex outer surfaces and generally concave inner surfaces, and the flush mounting thereof with the outer skin provides a substantially smooth aerodynamic surface over which the freestream ambient air 32 may flow with minimal drag during operation.

Correspondingly, the aft louver 56 is aligned between the forward and aft flaps 58,60 in the stowed position to close the inlet end of the tunnel along the inner skin 40. The aft louver 56 is integrally joined to the aft fairing 62 and aft flap 60 in a unitary or one-piece component for rotary movement together. Accordingly, the forward and aft flaps 58,60 and aft louver 56 conform with the contour of the inner skin 40 in the stowed position and are flush therein for providing an aerodynamically smooth outer boundary for the aft end of the fan bypass duct 46.

In this way, the louvers, flaps, and aft fairing conform with the respective outer and inner skins of the fan nacelle for maintaining minimum drag performance thereof for the fan bypass air channeled through the bypass duct 46 during operation, as well as for the ambient air stream flowing over the nacelle during aircraft flight.

Suitable means are provided for deploying or moving open in unison or synchronization the forward and aft louvers 54,56 and the forward and aft flaps 58,60, with the aft fairings 62 rotating with the aft louver and flap.

For example, the deploying means may include an elongate unison link 64 pivotally joining together the forward and aft louvers 54,56 and extending generally axially therebetween in the stowed position illustrated in FIG. 2. The link 64 coordinates or synchronizes the simultaneous movement of the forward and aft louvers during deployment, as well as during retraction.

A cooperating linear actuator 66 is mounted in the forward end of the compartment 50 and is operatively joined to both louvers, through the first louver 54 for example, for rotation thereof between the stowed position closing the flow tunnel and a deployed position opening the tunnel. In the stowed position illustrated in FIG. 2, the louvers, flaps, and aft fairing are all contained in the compartment provided therefor, whereas in the deployed position illustrated in FIG. 3, the louvers, flaps, and aft fairing are all pivoted open to permit reverse turning of the fan bypass air 32 outwardly through the flow tunnel 52.

In the deployed position, the forward and aft louvers 54,56 and the aft fairing 62 are pivoted open and extend radially outwardly from the outer skin 38. Correspondingly, the forward and aft flaps 58,60 are pivoted open and extend radially inwardly from the inner skin 40.

The actuator 66 has an elongate output rod suitably joined to the unison link 64 to power the louvers and flaps open during deployment, and retract the louvers and flaps during stowing. The actuator 66 may have any conventional configuration such as hydraulic, pneumatic, or electrical.

The radially inner surfaces of the forward and aft flaps 58,60 and aft louver 56 are concave circumferentially, whereas their outer surfaces are correspondingly convex circumferentially. And, as indicated above, the aft louver 56 and aft flap 60 are preferably integral with each other and coextensive both axially and circumferentially to provide one large door commonly pivoted along with the aft fairing 62 integrally joined to the middle thereof.

In this way, the aft louver and flap may be disposed flush with the inner skin 40 in the stowed position to close the aft end of the tunnel inlet. Correspondingly, the forward louver 54 is disposed flush in most part with the outer skin 38 in the stowed position for closing the forward part of the tunnel outlet. And, the aft fairing 62 is nested with the forward louver to close the aft part of the tunnel outlet, whereas the forward flap 58 is nested with the aft louver to close the forward part of the tunnel inlet in the stowed position.

As shown in FIG. 2, the forward louver 54 extends axially forward of the aft louver 56 and radially outwardly thereabove in the stowed position. Correspondingly, the aft fairing 62 is integrally joined to the aft louver 56 and spaced in most part radially thereabove and flush with the forward louver 54 and outer skin 38 in the stowed position.

The forward flap 58 illustrated in the stowed position in FIG. 2 is pivotally mounted in the compartment 50 radially below or inboard of the forward louver 54 with substantially equal axial length, and is disposed flush with the inner skin and adjacent the aft louver 56 and flap 60. Correspondingly, the aft louver 56 is disposed inboard of the aft fairing 62 with generally equal axial length, with the aft flap 60 extending aft therefrom.

In this configuration, the louvers and flaps may be deployed open by the actuator 66 as illustrated in FIG. 3 for effecting thrust reverse operation of the turbofan engine, while also providing a self-closing or self-stowing component of torque or moment M to assist in closing the louvers and flaps during the stowing operation. And, in the event of power loss in the actuator, the self-stowing closing moment M may use the aerodynamic pressure forces exerted by the fan bypass air 32 on the deployed aft flap 60 to retract and stow all the louvers and flaps.

The kinematic operation of the louvers and flaps are controlled by their respective sizes and relative pivot mounting points. These parameters may be conventionally determined for the particular design of the self-stowing fan thrust reverser matching the exemplary components illustrated in FIGS. 2 and 3.

For example, the various pivot joints required for supporting the louvers and flaps may be effected by suitable pivot bearings or bushings suitably mounted to stationary frames within the reverser compartment. And, the output rod of the actuator and its connection with the unison link 64 may be effected using conventional spherical rod end bearings suitably attached in corresponding clevis or other mounting brackets.

In the preferred embodiment illustrated in FIG. 2, the forward louver 54 is pivotally joined near its aft end in the compartment 50. The forward flap 58 is pivotally joined near its aft end in the compartment below the forward louver. And, both the aft louver 56 and integral aft flap 60 are pivotally joined in common in the compartment near the aft end of the aft louver 56 and the forward end of the aft flap 60.

In this way, the forward and aft louvers 54,56 may be pivoted radially outwardly as illustrated in FIG. 3 when deployed, whereas the forward and aft flaps 58,60 are pivoted radially inwardly into the fan bypass duct 46. The aft fairing 62 is pivoted radially outwardly along with the aft louver 56.

Figure 4:
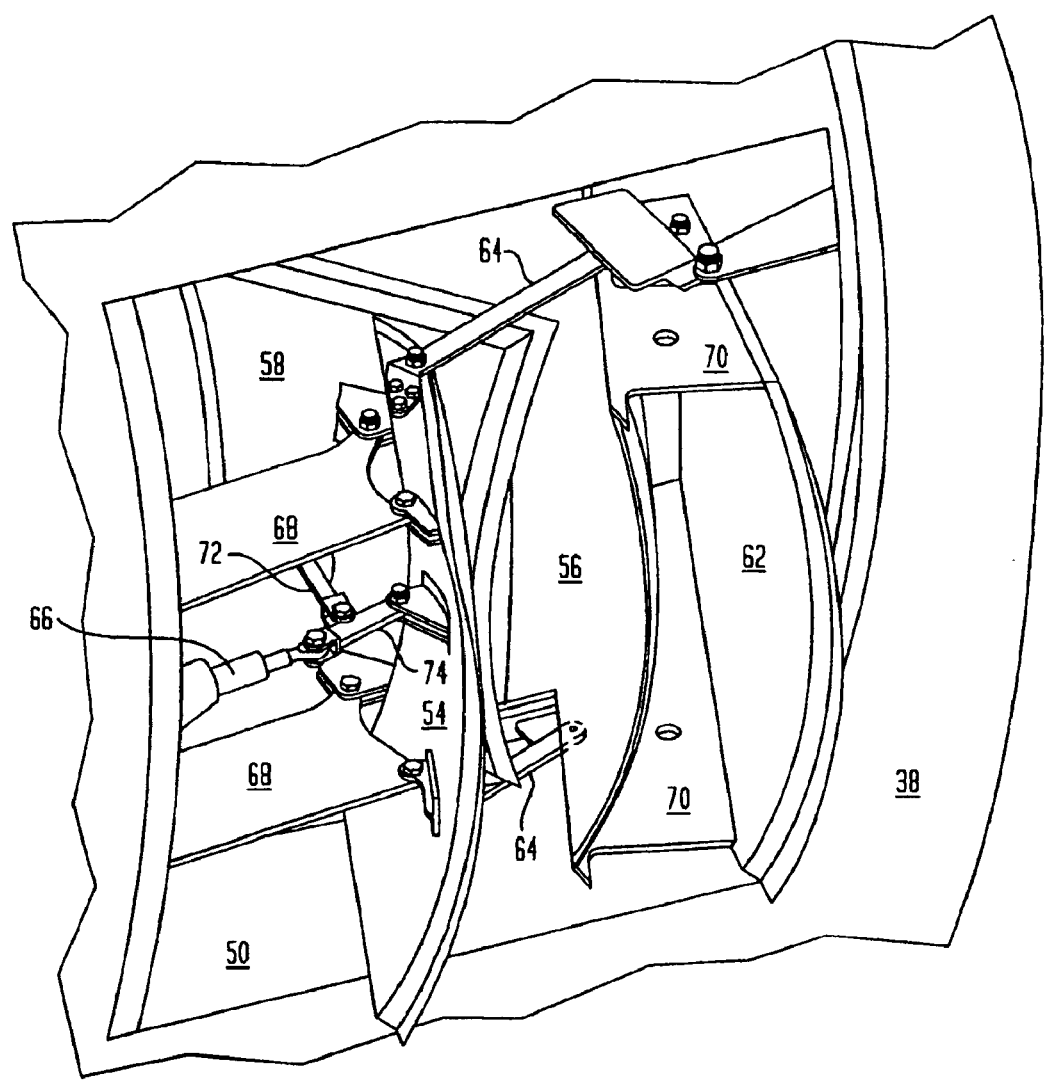
FIG. 4 is an enlarged isometric view of a representative set of the reverser louvers illustrated in FIG. 1 in an exemplary embodiment.

As best shown in FIGS. 3 and 4, a pair of laterally or circumferentially spaced apart cantilevers 68 extend aft in the compartment from the supporting forward wall or radial flange therein. The cantilevers are relatively thin in the circumferential direction and relatively tall in the radial direction for providing sufficient strength and rigidity for supporting the forward louver and flap. The forward louver 54 includes a pair of radially inwardly extending clevises which are pivotally mounted to the aft outer ends of the two cantilevers.

The forward flap 58 similarly includes a pair of radially outwardly extending clevises which are pivotally mounted to the aft inner ends of the two cantilevers. And, a pair of the unison links 64 pivotally join together the forward and aft louvers 54,56 at laterally opposite sides thereof using suitable pivot joints.

As illustrated in FIG. 4, a pair of thin plate side fences 70 integrally join together the aft louver 56 and aft fairing 62 on the opposite lateral sides thereof to provide a strong integral box structure. The two cantilevers 68 may be suitably joined to the side fences 70, with the side fences having corresponding pivot joints supported to suitable brackets in the compartment 50 for pivotally mounting therein the aft louver and fairing, and integral aft flap 60.

Whereas the unison links 64 synchronize deployment and retraction of the forward and aft louvers 54,56, the forward flap 58 is suitably pivotally joined to the forward louver 54 for synchronization therewith during deployment and retraction.

More specifically, an idler link 72 as illustrated in FIG. 3 pivotally joins together the forward louver 54 and the forward flap 58. A cooperating drive link 74 pivotally joins the output rod of the actuator 66 to the forward louver 54 for movement between the stowed and deployed positions. The idler link 72 may be conveniently joined to the middle of the drive link 74 for synchronous movement of the forward louver 54 and the forward flap 58 as the actuator drives the drive link 74 either axially forward during deployment or axially aft during stowing.

As shown in FIG. 4, a single drive link 74 may be used with a corresponding single actuator 66 and may be pivotally joined to the lateral or circumferential middle of the forward louver 54 for deployment thereof. Actuation loads are transferred through the drive link 74 and into the forward louver 54 for deployment thereof, with the deployment loads then being split along both unison links 64 for correspondingly driving the aft louver and flap joined thereto.

A single idler link 72 may be pivotally joined at its inner end in a clevis attached to the lateral middle of the forward flap 58, with its outer end being pivotally joined to the middle of the drive link 74 as shown in FIG. 4.

The two louvers 54,56 when deployed function to reverse the direction of the fan exhaust in the bypass duct 46 The aft flap 60 is sized to block aft flow of the fan bypass air 32 through the fan nozzle 48, and instead deflect the bypass air radially outwardly through the flow tunnel 52.

Correspondingly, the forward flap 58 is sized axially shorter than the aft flap 60 to prevent blocking of the fan exhaust, while instead providing a scoop for more efficiently turning a portion of the fan exhaust along the deployed forward louver 54.

Preferably, the forward louver 54 illustrated in FIG. 3 is joined to the cantilevers 68 to forwardly deploy radially outwardly, while the forward flap 58 is joined to the cantilevers to forwardly deploy radially inward in counterposition with the forward louver for reverse turning the exhaust flow from the bypass duct 46 and through the flow tunnel 52 of the nacelle. The forward louver 54 and forward flap 58 thusly have a general V-shaped configuration when deployed to more efficiently turn the fan exhaust. And, the deployed aft flap 60 turns the remainder of the fan exhaust radially outwardly along the aft louver 56.

In thrust reverse operation, the aft fairing 62 is hidden behind the aft louver 56 and provides no turning function. However, in the stowed position, the aft fairing 62 covers the aft louver 56 and conforms with the nacelle outer skin.

Accordingly, the forward flap 58 is specifically configured for initially turning a portion of the fan exhaust, whereas the aft flap 60 defines a blocker door to reverse the remaining portion of the fan exhaust and block flow through the fan outlet 44. Correspondingly, the forward and aft louvers 54,56 are deployed radially outwardly and inclined forwardly for maximizing efficiency of thrust reverse operation, with the two louvers 54,56 being generally parallel with each other in the deployed position, while the aft flap 60 is also generally parallel thereto since it is axially coextensive with the aft louver 56.

Note in FIG. 3 that the pivot points for the forward and aft louvers 54,56 are near their aft ends, with the unison link 64 being slightly aft thereof so that the louvers may be driven radially outwardly from the outer skin 38. Correspondingly, the forward flap 58 is joined in the compartment near its aft end, with the idler link 72 being joined forwardly thereof. The aft flap 60 is joined in the compartment near its forward end in common with the aft end of the aft louver 56, with the unison link 64 being joined thereto slightly aft of the common pivot point.

In this way, the common unison link 64 synchronizes rotary movement of the two louvers 54,56 and the two flaps 58,60 from the stowed position to the deployed position and back. Drive loads are carried through the unison link 64 to pivot open and close the two louvers and the aft flap 60. And, drive loads are carried through the small drive link 74 and idler link 72 to open and close the forward flap 58 in coordinated movement with the louvers and aft flap.

And, quite significantly, the integral construction of the aft flap 60 with the aft louver 56 develops the self-stowing closing moment M from the pressure of the fan exhaust 32 acting upon the inner or forward facing surface of the aft flap when deployed. This closing moment is in turn carried by the unison link 64 to assist in closing also the forward louver 54 and forward flap 58 notwithstanding the common actuator 66 therefor.

During normal operation of the actuator 66, the louvers and flaps are driven open and closed by the actuation force developed therein, with the closing moment M nevertheless assisting in stowing the components. However, in the event of any failure of the actuator 66 to develop sufficient retraction force during the stowing operation, the self-stowing moment M may be used to advantage to ensure complete stowing of the louvers and flaps.

The fan reverser 36 illustrated in FIGS. 1 and 2 is preferably located within the aft end of the fan nacelle itself and fully contained therein slightly upstream of the fixed area fan nozzle 48. When deployed, as illustrated in FIG. 3, the aft flap 60 is suitably sized to reach the core cowl 20 and suitably block discharge of the fan exhaust through the fan nozzle for reversing thrust along the deployed louvers.

As shown in FIG. 1, the louvers, flaps, and cooperating aft fairing are replicated in corresponding gangs around the circumference of the fan nacelle for providing thrust reverse operation around the circumference thereof. The numbers of gangs may be selected as desired to substantially block corresponding circumferential portions of the fan nozzle 48 during thrust reverse operation.

Furthermore, since the corresponding flow tunnels 52 extend radially through the fan nacelle, each of the louvers, flaps, and aft fairings may have corresponding perimeter edges suitably sealed to each other and the outer and inner skins for reducing or preventing undesirable leakage of airflow through the fan reverser when stowed. Various conventional perimeter or leaf seals may be used for this function and suitably incorporated in the fan reverser.

Yet further, a suitable latching or locking mechanism may be incorporated inside the several compartments to lock shut the louvers and flaps in the stowed position and prevent inadvertent deployment thereof when not intended. Any conventional latching mechanism may be used for this purpose.

The louvered fan thrust reverser disclosed above enjoys the various advantages listed in the specifically identified objects described above. And, a particular advantage of the reverser is the self-stowing capability provided by the integral aft flap 60.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A thrust reverser comprising:
   a fan nacelle having radially outer and inner skins extending axially from a leading edge defining an inlet to a trailing edge defining an outlet, and spaced apart radially to define a compartment spaced forwardly from said outlet;
   a forward louver pivotally mounted in said compartment;
   a forward flap pivotally mounted in said compartment below said forward louver, and pivotally joined to said forward louver for synchronization therewith;
   an aft louver pivotally mounted in said compartment behind said forward louver;
   an aft flap integrally joined to said aft louver for rotation therewith;
   a unison link pivotally joining together said forward and aft louvers; and
   an actuator joined to said louvers for rotation thereof between a stowed position contained in said compartment to a deployed position at which said forward and aft louvers are pivoted open outwardly from said outer skin, and said forward and aft flaps are pivoted open inwardly from said inner skin.

2. A reverser according to claim 1 wherein:
said aft louver and aft flap are coextensive, and disposed flush with said forward flap and inner skin in said stowed position; and
said forward louver is disposed flush with said outer skin in said stowed position.

3. A thrust reverser comprising:
a fan nacelle having radially outer and inner skins extending axially from a leading edge defining an inlet to a trailing edge defining an outlet, and spaced apart radially to define a compartment spaced forwardly from said outlet;
a forward louver pivotally mounted in said compartment, and disposed flush with said outer skin in a stowed position;
an aft louver pivotally mounted in said compartment behind said forward louver, and said forward louver extends forward of said aft louver in said stowed position;
an aft flat integrally joined coextensive with said aft louver for rotation therewith, and disposed flush with said inner skin in said stowed position;
an aft fairing integrally joined to said aft louver, and spaced in part thereabove flush with said forward louver and outer skin in said stowed position;
a unison link pivotally joining together said forward and aft louvers; and
an actuator joined to said louvers for rotation thereof between said stowed position contained in said compartment to a deployed position at which said louvers are pivoted open outwardly from said outer skin, and said aft flap is pivoted open inwardly from said inner skin.

4. A reverser according to claim 3 further comprising:
a forward flap pivotally mounted in said compartment below said forward louver, and disposed flush with said inner skin and aft flap in said stowed position.

5. A reverser according to claim 4 wherein said forward flap is pivotally joined to said forward louver for synchronization therewith.

6. A reverser according to claim 5 wherein:
said forward louver is pivotally joined near an aft end thereof in said compartment;
said forward flap is pivotally joined near an aft end thereof in said compartment; and
both said aft louver and aft flap are pivotally joined in common in said compartment near an aft end of said aft louver and near a forward end of said aft flap.

7. A reverser according to claim 6 further comprising:
an idler link pivotally joining together said forward louver and forward flap; and
a drive link pivotally joining said actuator to said forward louver for movement between said stowed and deployed positions.

8. A reverser according to claim 7 further comprising:
a pair of laterally spaced apart cantilevers extending aft in said compartment;
said forward louver and forward flap being pivotally joined to both said cantilevers; and
a pair of said unison links pivotally joining together said forward and aft louvers at laterally opposite sides thereof.

9. A reverser according to claim 8 wherein said drive link is pivotally joined to the lateral middle of said forward louver.

10. A reverser according to claim 9 wherein said idler link is pivotally joined to the lateral middle of said forward flap.

11. A reverser according to claim 10 wherein said forward flap is shorter than said aft flap.

12. A reverser according to claim 11 wherein forward louver is joined to said cantilevers to forwardly deploy outward, and said forward flap is joined to said cantilevers to forwardly deploy inward in counter-position with said forward louver for reverse turning exhaust flow through said nacelle.

13. A reverser according to claim 12 wherein said aft louver and aft flap are pivotally joined in said compartment to parallel said forward louver in said deployed position.

14. A reverser according to claim 13 further comprising:
a core engine having an external core cowl mounted inside said nacelle to define an annular bypass duct therebetween terminating in a fan nozzle at said nacelle trailing edge; and
said aft flap is sized to reach said core cowl when deployed, and block flow discharge through said fan nozzle for reversing thrust along said deployed louvers.

15. A fan thrust reverser comprising:
a fan nacelle having outer and inner skins extending between leading and trailing edges, and an arcuate compartment between said skins having a flow tunnel extending radially therebetween;
a forward louver and aft fairing pivotally mounted in said compartment to close said tunnel along said outer skin in a stowed position;
a forward flap and an aft flap pivotally mounted in said compartment along said inner skin;
an aft louver aligned between said forward and aft flaps in said stowed position to close said tunnel along said inner skin, and integrally joined to said aft fairing and aft flap for movement therewith; and
means for deploying open in unison said forward and aft louvers and said forward and aft flaps.

16. A reverser according to claim 15 wherein:
said forward louver is pivotally joined near an aft end thereof in said compartment;
said forward flap is pivotally joined near an aft end thereof in said compartment; and
both said aft louver and aft flap are pivotally joined in common in said compartment near an aft end of said aft louver and near a forward end of said aft flap.

17. A reverser according to claim 16 wherein:
said aft louver and aft flap are coextensive, and disposed flush with said inner skin in said stowed position; and
said forward louver is disposed flush with said outer skin in said stowed position.

18. A reverser according to claim 17 wherein said deploying means comprise:
a unison link pivotally joining together said forward and aft louvers;
an idler link pivotally joining together said forward louver and forward flap; and
an actuator joined to said forward louver for rotation thereof between said stowed position and a deployed position, with said unison and idler links synchronizing rotation of said aft louver and aft flap with said forward louver and forward flap.

19. A reverser according to claim 18 wherein forward louver is joined in said compartment to forwardly deploy outward, and said forward flap is joined in said compartment to forwardly deploy inward in counter-position with said forward louver for reverse turning exhaust flow through said nacelle.

20. A reverser according to claim 19 wherein said aft louver and aft flap are pivotally joined in said compartment to parallel said forward louver in said deployed position.

21. A reverser according to claim 20 further comprising:
a pair of laterally spaced apart cantilevers extending aft in said compartment;
said forward louver and forward flap being pivotally joined to both said cantilevers; and
a pair of said unison links pivotally joining together said forward and aft louvers at laterally opposite sides thereof.

22. A reverser according to claim 21 wherein said drive link is pivotally joined to the lateral middle of said forward louver.

23. A reverser according to claim 22 wherein said idler link is pivotally joined to the lateral middle of said forward flap.

24. A reverser according to claim 21 wherein said forward flap is shorter than said aft flap.

25. A reverser according to claim 21 further comprising:
a core engine having an external core cowl mounted inside said nacelle to define an annular bypass duct therebetween terminating in a fan nozzle at said nacelle trailing edge; and
said aft flap is sized to reach said core cowl when deployed, and block flow discharge through said fan nozzle for reversing thrust along said deployed louvers.

* * * * *